(12) United States Patent
Viaud et al.

(10) Patent No.: US 7,617,653 B2
(45) Date of Patent: Nov. 17, 2009

(54) BALING PRESS

(75) Inventors: Jean Viaud, Gray (FR); Emmanuel Chapon, Velet (FR)

(73) Assignee: Deere & Company, Moline, IL (US)

( * ) Notice: Subject to any disclaimer, the term of this patent is extended or adjusted under 35 U.S.C. 154(b) by 348 days.

(21) Appl. No.: 11/678,103

(22) Filed: Feb. 23, 2007

(65) Prior Publication Data

US 2008/0282662 A1    Nov. 20, 2008

(30) Foreign Application Priority Data

Oct. 13, 2004    (DE) .................. 10 2004 049 847

(51) Int. Cl.
*B65B 63/04*    (2006.01)
(52) U.S. Cl. .................. 53/118; 53/211; 53/225; 53/587; 53/389.2; 100/5; 100/13

(58) Field of Classification Search ............... 53/118, 53/211, 215, 216, 225, 234, 587, 389.2–389.5; 100/5, 13
See application file for complete search history.

(56) References Cited

U.S. PATENT DOCUMENTS

| 4,608,807 A | * | 9/1986 | Skripalle | 53/399 |
| 5,129,207 A | | 7/1992 | Butler | |
| 5,692,365 A | * | 12/1997 | Meyer et al. | 53/587 |
| 6,116,002 A | * | 9/2000 | Roth | 53/587 |

FOREIGN PATENT DOCUMENTS

EP    503 046    7/1994

* cited by examiner

*Primary Examiner*—Hemant M Desai

(57) ABSTRACT

A baling press having a pressing chamber and an apparatus for wrapping a bale in a wrapping web and having at least one rotating conveyor element is proposed, wherein the conveyor element advances the wrapping web to the bale.

12 Claims, 3 Drawing Sheets

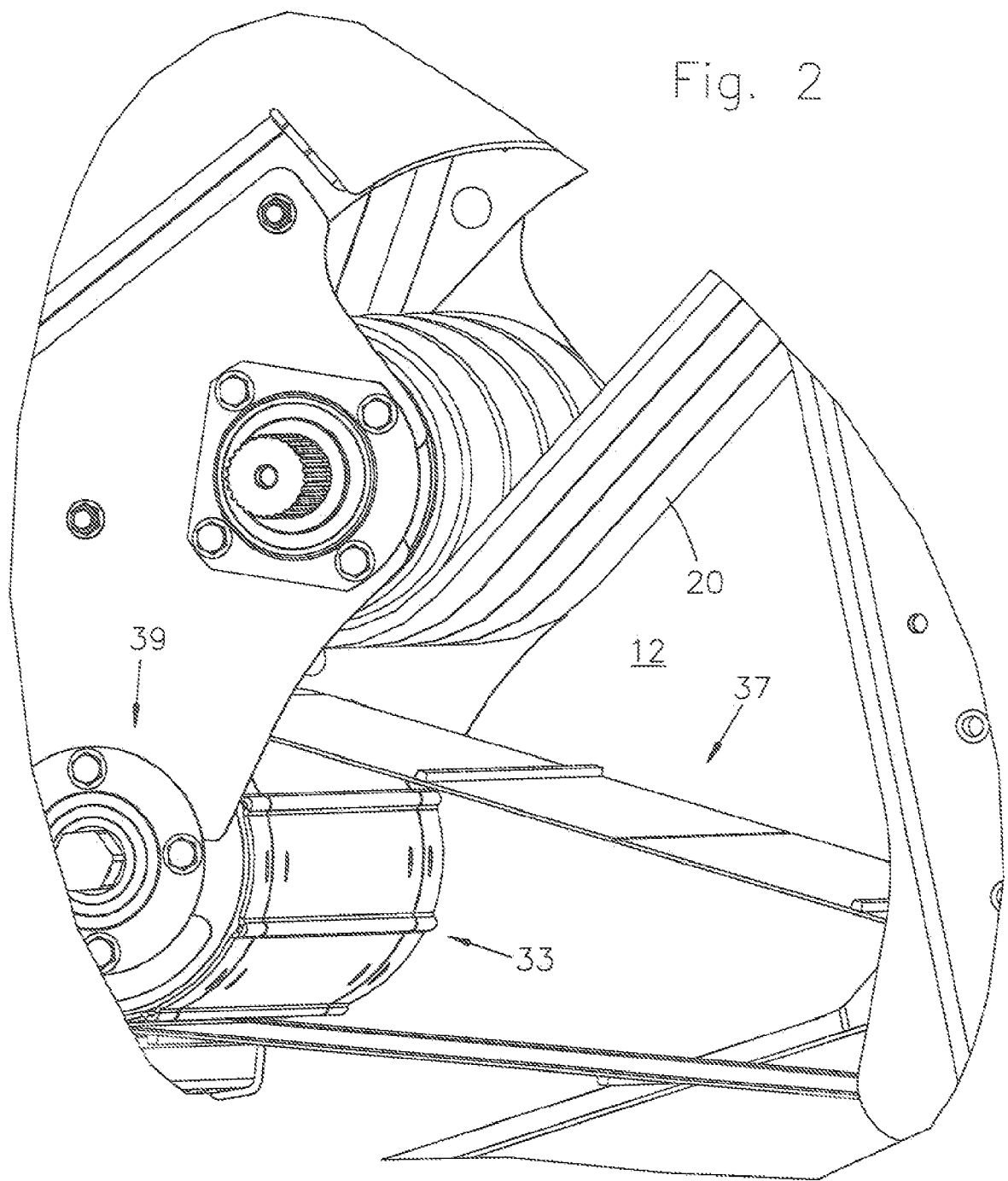

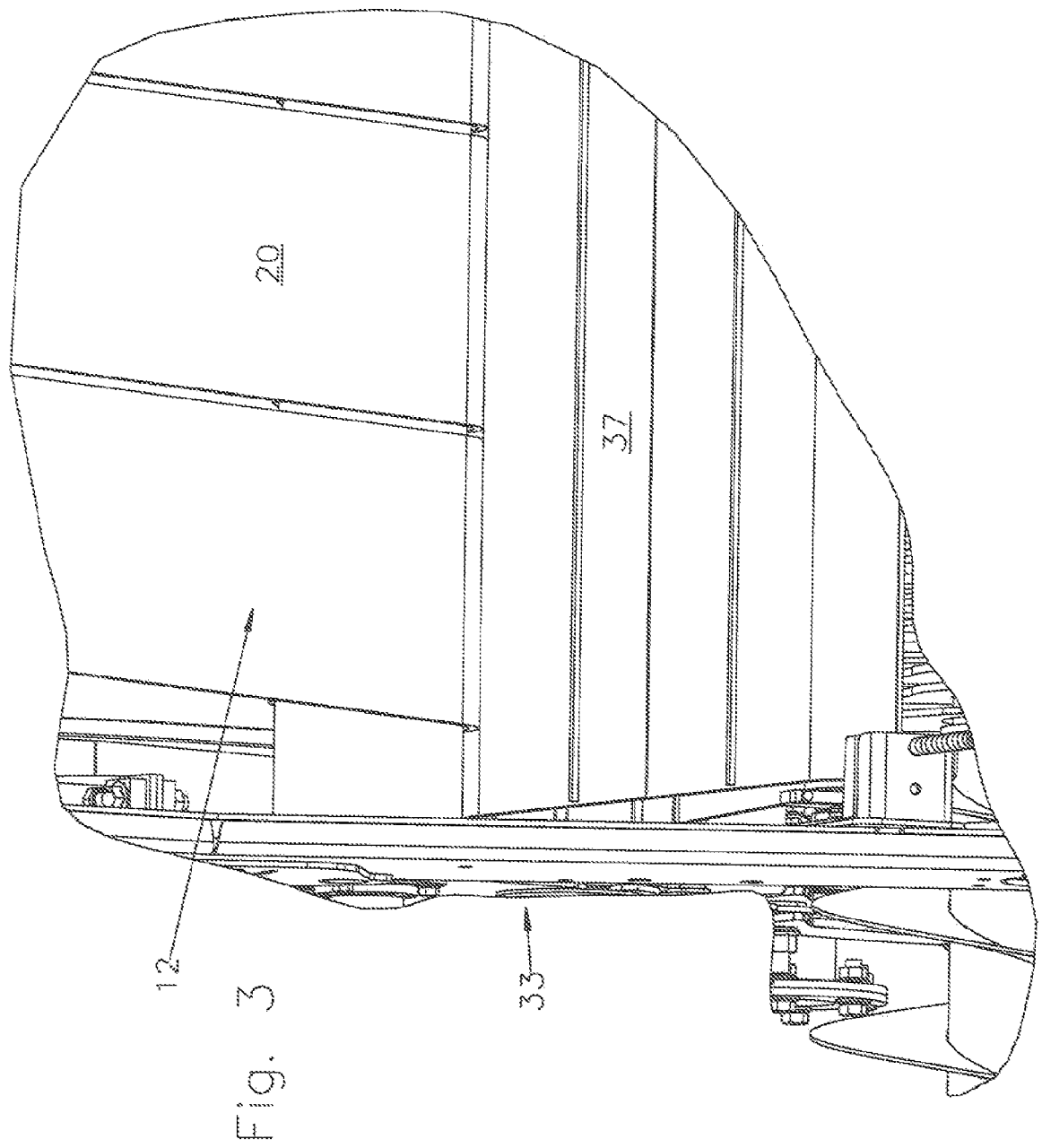

ical device, means being provided which, in said case, a baling
BALING PRESS

FIELD OF THE INVENTION

The invention relates to a baling press having a pressing chamber and an apparatus for wrapping a bale in a wrapping web and having at least one rotating conveyor element.

BACKGROUND OF THE INVENTION

The invention relates to a baling press having a pressing chamber and an apparatus for wrapping a bale in a wrapping web and having at least one rotating conveyor element.

U.S. Pat. No. 5,129,207 shows a baling press having a baling chamber, which is defined by a plurality of bale-forming belts and defines an opening through which the crop material enters into the chamber. Wrapping material supply means having a feed roll housing for feeding wrapping material from a feed roll are provided to wrap the bale after its formation, the supply means cooperating with the bale-forming belts for the transportation of tie wrapping material

SUMMARY OF THE INVENTION

According to the present invention there is provided an optimized version of a baling press and wrapping device of the type disclosed in EP-BI-0 503 046;

An object of the invention is to provide a baling press having a pressing chamber and a bale wrapping apparatus, for wrapping a bale in a wrapping web, having at least one rotating conveyor element, which delivers the wrapping web directly to the bale and loops around the at least two rollers characterized in that the pressing chamber (12) is configured such that it is substantially open to the side, at least in the region of the conveyor element (37).

A baling press having a pressing chamber and an apparatus for wrapping a bale in a wrapping web and having at least one rotating conveyor element is shown. Since the rotating conveyor element delivers the wrapping web to the bale, no further conveyor devices are required. Since, also, the conveyor element does not cooperate with belts or other pressing means in order to be transported to the bale, but rather the wrapping web transported to the bale by the conveyor element is grabbed directly by the bale, a particularly uniform conveyance of the wrapping web is achieved and an entanglement, and hence a poor winding result, is prevented. The pressing chamber is configured such that it is substantially open to the side, at least in the region of the conveyor element. This can be achieved, for example, by the fact that side walls which laterally limit the pressing chamber are designed at least substantially open in this region or have corresponding recesses. In this way, the conveyor element, or the rollers which are looped around by the conveyor element, is/are easily accessible and can easily be cleared of material accumulations or contaminations and serviced.

The conveyor element can have at least one rotating belt or can be configured as such. Belts are components which are frequently used on baling presses, are cost-effective and durable.

If the conveyor element is configured in one piece or if the conveyor element is formed by a one-piece belt, then the conveyor element covers the whole of the feed chamber. An accumulation of material in the supply region, which in a multipart construction can occur particularly in the region of gaps/interspaces between individual conveyor elements or conveyor element parts, and especially in a central region of the supply region, is precluded. If a plurality of conveyor elements or conveyor element parts are provided, then it may be necessary or sensible, for individual or for all conveyor element/conveyor element parts, to provide guide means which prevent a change of position or a crossing of the conveyor elements/conveyor element parts. A one-piece construction has the advantage that the number of guide means can be reduced or such guide means can be wholly dispensed with.

The surface or the peripheral face of the conveyor element can be designed smooth or, indeed, structured, for example in order to influence a transportation of the wrapping material in the desired manner. If the conveyor element has projections, then this can influence the transportation of the wrapping material; in particular, however, material from the pressing chamber can be forced back into it by means of these projections, which material is led out of the pressing chamber by the belt which limits the latter.

If the width exceeds at least that of the first roller, or else the width of both rollers and/or of the conveyor element exceeds the width of the pressing chamber, then appropriate bearings can be disposed outside the pressing chamber or can project as little as possible into this. An interaction or obstruction of the material flow can thereby be minimized.

It is conceivable for the conveyor element to loop around rods or other suitable components. Preferably, however, it loops around at least one, though preferably two rollers, whereof at least one is arranged such that it is rotatable, thereby helping the conveyor element to display rotating behaviour which is as uniform as possible. It can also be provided that the roller(s) is/are of multipart configuration, or that a plurality of rollers/rolls are disposed on a common axis.

At least one of the rollers can be constituted by a baling element which acts, for example, directly on the bale to be formed or which cooperates with a further baling element, for example by being looped around by a belt acting on the bale.

It is conceivable to provide a drive which acts on the conveyor element independently of the rollers in order to drive the said conveyor element. For example, a further roller can be provided, which acts on an outer side of the conveyor element. If, however, at least one of the rollers can be driven in such a way that the conveyor element can be rotatingly driven, then no further component has to be provided. Moreover, such a roller is very largely protected from dirt contaminations, since it is looped around by the conveyor element and is thus disposed inside the conveyor element or in protected arrangement, thereby helping to make the driving of the conveyor element as trouble-free as possible; this, in particular, when the conveyor element is configured in one piece or in the form of a one-piece belt. The roller can be arranged to be permanently driven, in this way, contaminations can be continually transported in the direction of the bale and do not accumulate on the conveyor element. A selective drive which is only actively connected to the conveyor element, for example, when wrapping web is actually intended to be delivered to the bale is alternatively possible, A particularly uniform rotation or driving of the conveyor element can be obtained if the roller(s), or, in particular, the or one of the driven roller(s), has/have a high-friction coating.

Preferably, the apparatus has at least one conveyor means which draw(s) off the wrapping web from a store, for example in the form of a roll, so that the wrapping web can make its way to the rotating conveyor element so as to be delivered to the bale.

It is possible to arrange for the wrapping web to tear off after completion of the wrapping operation, for example by the bale continuing to rotate and by the supply of wrapping web from the store being interrupted. In order to prevent a non-uniform tear-off edge and thus an entanglement of the wrapping web, a cutting device having a blade, for example, can be provided, which cuts or severs the wrapping web. This cutting device can cooperate in such a way with a guide device, which, for example, transports the wrapping web to the conveyor element, that this guide device serves as a support or positional securement for the wrapping web.

The baling press preferably has a pressing material feeder which is preferably configured as or comprises a conveyor rotor having, in particular, dogs, in order to convey the pressing material into the pressing chamber.

If the pressing material feeder is disposed at least essentially beneath the conveyor element, then the conveyor element can keep material, for example in the form of dirt contaminations, comminuted pressing material, etc. remote from the pressing material feeder, thereby precluding a blockage of the pressing material feeder. If the pressing material feeder cooperates with a cutting device, then the pressing material conveyed by the pressing material feeder is further comminuted by the cutting device, whereby a more uniform bale is formed. The pressing material feeder and the cutting device are preferably disposed in a feed duct of the baling press, by which the pressing material received by a receiving device makes its way into a pressing chamber of the baling press, in which the bale is formed and is subsequently wrapped.

The pressing material feeder can easily be provided adjacent to the pressing chamber of the bale press which receives the bale; it is also conceivable, however, for further conveyor devices, including in the form of a starter roll or in the form of belts, etc., to be provided between the pressing material feeder and the pressing chamber, which further conveyor devices contribute to the baling or may also be provided independently of the baling.

The pressing material feeder can be disposed downstream of a receiving device of the baling press, which receives material to be pressed, for example, from the ground surface. Such a receiving device can be constituted, for example, by a conventional pick-up it is also conceivable, however, for this to be differently configured, for example in the form of a conveyor belt.

The pressing material feeder or the conveyor rotor can convey in an overshot or, indeed, in an undershot manner, in the case of an overshot conveyance, the wrapping web is fed preferably from above. A bale-wrapping apparatus can be used in industry on baling presses forming bales of paper, waste materials, textile materials, etc, Such an apparatus is particularly suitable, however, for use on an agricultural baling press for bales of agricultural crop materials, which are usually attached to a towing vehicle, and in particular on round balers, since these must be constructionally simple and operationally reliable for harvesting use.

An illustrative embodiment of the present invention is represented below in the drawing.

BRIEF DESCRIPTION OF THE DRAWINGS

An illustrative embodiment of the invention, described in greater detail below, is represented in the drawing, wherein:

FIG. 2 shows a detailed view of the pressing chambers in the region of a conveyor element, and FIG. 3 shows the conveyor element and a part of the pressing chamber.

DESCRIPTION OF THE PREFERRED EMBODIMENT

Figure 1:
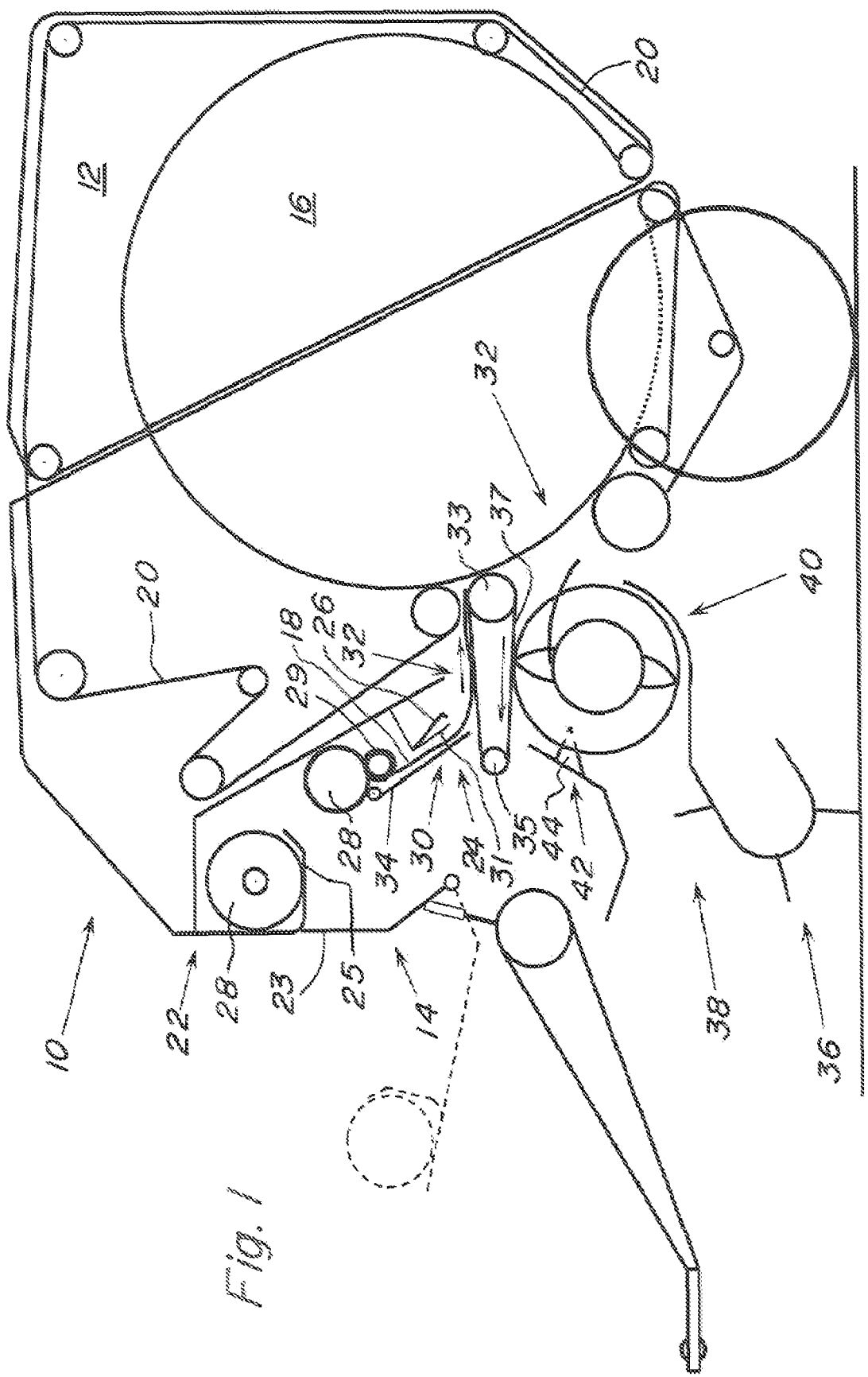
FIG. 1 shows a schematic representation of a baling press having an apparatus for wrapping a bale in a wrapping web.

FIG. 1 shows a baling press 10 of substantially conventional construction, having a pressing chamber 12. in accordance with the present illustrative embodiment, a wrapping wrapping apparatus 14 is additionally provided for wrapping a bale 16 formed in the pressing chamber 12 in a wrapping web 18.

The baling press 10 can be constituted by a known construction, i.e. having a pressing chamber 12 of constant or variable size, which is surrounded by rolls, by chains era combination of belts and chains, or, as in the illustrative embodiment, by belts 20.

Such a baling press 10 can be used in agriculture to form bales 16 of crop material such as, for example, straw, hay or grass. Use in industrial fields is also conceivable, however.

in the present embodiment, the wrapping apparatus 14 is provided on the front side of the baling press 10. The wrapping web 18 is fed through a gap to the pressing chamber 12, where it is carried along by the rotated bale 16. The wrapping apparatus 14 can also, however, be disposed in a central region of the baling press 10 or, indeed, in front of or above the pressing chamber 12.

The bale 16 is bound by means of the wrapping web 18 and is thus prevented from falling apart after leaving the baling press 10. The wrapping web 18 can be constituted by film, gauze, fabric, paper or the like.

The wrapping apparatus 14 has a housing 22, feeding means 24 which feed the wrapping web 18 to the bale 16, and a cutting device 28. In the housing 22, the wrapping web 18 is mounted as a stored supply roll 28. The housing 22 can also be configured such that it stores a plurality of rolls 28 and/or has steps or troughs for the positional securement thereof. In the present illustrative embodiment, the housing 22 has a flap 23 pivotably connected to the rest of the housing 22, by which the housing 22 can be closed. The flap 23 is provided with an intermediate floor 25, which is configured such that it forms a support for a further roll 28, which support can be transported in the baling press 10 as store. The flap 23 can be brought manually or, indeed, automatically or by motorized means, for example with the aid of a hydraulic cylinder, say in the form of a motor or, indeed, of a damper, into an open setting in which the roll 28 can comfortably be removed or loaded by an operator.

The feeding means 24 include a propulsion element 29 in the form of a feed roll having a peripheral face provided with a high-friction coating and can be set in rotation. The rotation initially helps to draw off the wrapping web 18 from an active supply roll 28, which is partially supported on the conveyor means 29 and helps to develop a tension in the wrapping web 18 during the wrapping operation due to a braked rotary motion. In its operating setting, the roll 28 comes to bear against the propulsion element 29 with a region roughly corresponding to a 4 o'clock to 6 o'clock setting.

In addition, the wrapping apparatus 14 includes a guide device 30, which transports the wrapping web 18 to a conveyor device 32 that conveys the wrapping web 18 in the direction of the bale 16.

The guide device 30 is configured in the form of a duct defined by parallel, flat, rear and front walls 31 and 34, respectively, each of which extends at least over the entire width of the wrapping web 18 and is closed in side regions and which reaches approximately up to the conveyor device 32. It is noted that the front wall 34 is considerably longer than the rear wall 31 and is inclined steeply down and to the rear from a location just forward of the propulsion element 29 to a location just above the conveyor element 37. Alternatively, the front wall 34 could be provided by itself so as to provide a guide device, for example in the form of a baffle plate beneath the wrapping web 18. It is also conceivable for the wrapping web 18 to reach the conveyor device 32 purely under its own weight.

In conjunction with the guide device 30, one or more blowers can be provided, which blow air into the duct directly, or via tubes or lines, in order to convey the wrapping web 18 In the direction of the bale 18 or, indeed, to prevent the wrapping web 18 from adhering to the front wall 34, especially if the wrapping web 18 is coated with an adhesive or is of self-adhesive or adhesive configuration, by generating on the front wall 34 an air cushion on which the wrapping web 18 floats.

The conveyor device 32 has two spaced apart rollers 33, 35, whereof a first roller 33 is provided adjacent to the pressing chamber 12 and the other roller 35 is provided at a distance from the pressing chamber 12 essentially beneath the guide device 30, Trained or looped about the two rollers 33, 35 is a rotating conveyor element 37 in the form of a belt. in order to set the conveyor element 37 in motion, at least one of the rollers 33, 35, preferably the roller 33 adjoining the pressing chamber 12, is designed such that if can be driven. The most uniform possible motion of the conveyor element 37 can be obtained if the roller 33 is provided with a high-friction coating. In order to prevent blockage or fraying of the wrapping web 18, one or more guide device(s), for example in the form of one or more baffle plate(s), can be provided, which prevent, (s) contact between the rollers and the wrapping web.

Reference is now made to FIG. 2, which illustrates that the pressing chamber 12 in the region of the rollers 33, 35 is configured such that mountings 38 are provided to support the rollers 33, 35, yet the region to the side is otherwise fully open, so that the rollers 33, 35 are easily accessible, especially for the removal of contaminations or accumulating material and/or for servicing purposes. In addition, the rollers 33, 35 and the conveyor element 37 have a width which exceeds the width of the pressing chamber 12, so that their end regions protrude from the pressing chamber 12 (see FIG. 3).

Apart from this wrapping apparatus 14, the baling press 10 also has a receiving device 36 in the form of a conventional pick-up, which receives cut crop material from the ground and introduces it into a feed duct 38. In the feed duct 38 there is provided a pressing material feeder 40 defined by a conveyor rotor having transversely spaced, radially extending flat plates forming dogs, which introduces into the pressing chamber 12 the crop material fed from the receiving device 36.

In addition, the pressing material feeder 40 cooperates in a known manner with a cutting device 42 which is provided in the feed duct 38 above the pressing material feeder 40, but which can also be positioned beneath the pressing material feeder 40 or elsewhere. The cutting device 42 has a plurality of blades 44, which project into the conveyor region of the pressing material feeder 40 at respective positions between the transversely spaced dogs in order further to comminute the crop material.

The working method of the baling press 10 and of the wrapping apparatus 14 shall be briefly summarized below.

By means of the receiving apparatus 36, crop material is introduced via the feed duct 38 and the pressing material feeder 40 into the pressing chamber 12 of the baling press 10, where it is conventionally compressed by the belts 20 into a bale 16, Following the conclusion of the baling, this time being able to be determined, for example, by one or more bale-size sensors, a time control, a flow rate detector, etc., the wrapping apparatus 14 is activated so as to wrap the bale 16 in wrapping material 18. This activation can be realized, for example, by means of a control or regulating unit (not shown), which can be provided on the baling press 10 itself or on a towing vehicle (not shown), such as a farm tractor. For the commencement of the wrapping operation, the propulsion element 29 is set in rotation so as to draw off wrapping material from the roll 28. The wrapping material 18 makes its way between the rear and front walls 31 and 34 of the duct and is transported by the action of the propulsion element 29 and, where available, by the above-described blower action, in the direction of the conveyor device 32. The wrapping web 18 exits from the duct in such a way that, at least substantially from above, it hits an upper surface location of the conveyor element 37 in the region of the roller 35 and is conveyed on the top side of the conveyor element 37 in the direction of the pressing chamber 12, where it is gripped by the rotating bale 16 and enwraps the latter.

Once the wrapping operation of the bale 16 is concluded, which can be determined by conventional sensors or, indeed, by a time control, etc. the wrapping web 18 is cut through by means of a cutting device 26 pivotably attached to the rear wall 31 of the duct and cooperating with a bottom edge of the wall 31 to sever the web 18. After this, the finished bale 16 is ejected from the baling press 10.

Having described the preferred embodiment, it will become apparent that various modifications can be made without departing from the scope of the invention as defined in the accompanying claims.

The invention claimed is:

1. In a baling press having a pressing chamber and a wrapping apparatus for wrapping a bale in a wrapping web, with the wrapping apparatus having at least one rotating conveyor element looped about at least two rollers and which aids in delivering the wrapping web directly to the bale, the improvement comprising: said pressing chamber being configured for defining a substantially open gap at one of a front or rear region of said pressing chamber; said conveyor element having a substantially horizontal upper surface extending between said at least two rollers; one of said at least two rollers being located within said gap; said wrapping apparatus further including a wrapping web supply roll supported above said conveyor element; and a propulsion element being engaged with said supply roll and being operable for pulling wrapping web from said supply roll and propelling the wrapping web to said top surface of said conveyor element, whereby said conveyor element is operable for delivering wrapping web directly to said bale.

2. The baling press, as defined in claim 1, wherein said conveyor element includes at least one rotating belt.

3. The baling press, as defined in claim 1 wherein said conveyor element is a belt configured in one piece.

4. The baling press, as defined in claim 1, wherein said conveyor element has a width that exceeds that of said pressing chamber.

5. The baling press, as defined in claim 1, wherein at least one of said two rollers is driven.

6. The baling press, as defined in claim 1, wherein at least one of said two rollers serves as a bale-forming element.

7. The baling press, as defined in claim 1, wherein at least one of said two rollers is driven and has a high-friction coating.

8. The baling press, as defined in claim 1, wherein said apparatus for wrapping includes a guide device defined by a duct extending between said supply roll and an upper surface of said conveyor element; and a cutting device mounted for cooperating with said guide device for severing said length of wrapping material after a bale is wrapped so that wrapping material engaged with said bale is separated from said supply roll.

9. The baling press, as defined in claim 1, wherein said gap of said pressing chamber which is open extends below said conveyor element, said baling press further including a crop material feeder defined by a conveyor rotor located directly below said conveyor element.

10. The baling press, as defined in claim 9, wherein said rotor includes a plurality of radially projecting, flat dogs spaced transversely from each other along said rotor; and said baling press further includes a cutting device having a plurality of transversely knives spaced respectively projecting between adjacent transversely spaced dogs so as to cooperate with said dogs in cutting conveyed crop material.

11. The baling press, as defined in claim 10, wherein said baling press further includes a crop material receiving device located for delivering crop material to said rotor.

12. The baling press, as defined in claim 10, wherein said rotor conveys in one of an overshot or undershot manner.

* * * * *